United States Patent
Musil et al.

(10) Patent No.: US 9,139,926 B2
(45) Date of Patent: Sep. 22, 2015

(54) PROCESS FOR MAKING HEAT STABLE COLOR ANODIZED ALUMINUM AND ARTICLES FORMED THEREBY

(75) Inventors: David Charles Musil, Cumming, GA (US); Nina Frazier, Mableton, GA (US); Lyle Robert Stiles, Jr., Whitehouse, OH (US)

(73) Assignee: CALPHALON CORPORATION, Atlanta, GA (US)

( * ) Notice: Subject to any disclaimer, the term of this patent is extended or adjusted under 35 U.S.C. 154(b) by 1005 days.

(21) Appl. No.: 13/204,458

(22) Filed: Aug. 5, 2011

(65) Prior Publication Data
US 2013/0032599 A1    Feb. 7, 2013

(51) Int. Cl.
| | | |
|---|---|---|
| *C25D 11/04* | (2006.01) | |
| *C25D 11/20* | (2006.01) | |
| *C25D 11/22* | (2006.01) | |
| *C25D 3/30* | (2006.01) | |
| *C25D 3/38* | (2006.01) | |
| *C25D 5/10* | (2006.01) | |
| *A47J 36/02* | (2006.01) | |
| *C25D 5/18* | (2006.01) | |
| *C25D 11/24* | (2006.01) | |

(52) U.S. Cl.
CPC . *C25D 3/30* (2013.01); *A47J 36/02* (2013.01); *C25D 3/38* (2013.01); *C25D 5/10* (2013.01); *C25D 11/22* (2013.01); *C25D 5/18* (2013.01); *C25D 11/246* (2013.01)

(58) Field of Classification Search
CPC ............ C25D 5/10; C25D 7/00; C25D 11/22
USPC .................................................. 205/173, 172
See application file for complete search history.

(56) References Cited

U.S. PATENT DOCUMENTS

| | | | |
|---|---|---|---|
| 3,669,855 A | 6/1972 | Smith | |
| 4,128,461 A | 12/1978 | Lerner et al. | |
| 4,133,725 A | 1/1979 | Lerner et al. | |
| 5,587,063 A * | 12/1996 | Kuhm et al. | ................. 205/173 |
| 7,820,300 B2 | 10/2010 | Dolan | |
| 2010/0143622 A1 | 6/2010 | Schreuder | |
| 2011/0017603 A1 | 1/2011 | Cheng | |

FOREIGN PATENT DOCUMENTS

| | | | | |
|---|---|---|---|---|
| GB | 1482390 A | * | 8/1977 | ............. C25D 11/22 |
| JP | 54116349 A | * | 9/1979 | ............. C25D 11/22 |
| JP | 08134572 A | * | 5/1996 | ............. C22C 21/00 |
| KR | 2003040290 A | * | 5/2003 | ............. C25D 11/02 |

\* cited by examiner

*Primary Examiner* — Edna Wong
(74) *Attorney, Agent, or Firm* — Sutherland Asbill & Brennan LLP

(57) ABSTRACT

A process of hard anodizing or Type III anodizing an aluminum article creates a heat stable, hard anodized, color surface on the exterior of the article. The process includes anodizing the aluminum article to achieve a hard anodized base layer on a surface of the article. A copper layer is deposited after the exterior is hard anodized. A tin layer is deposited after the step of depositing the copper layer.

8 Claims, 2 Drawing Sheets

PROCESS FOR MAKING HEAT STABLE COLOR ANODIZED ALUMINUM AND ARTICLES FORMED THEREBY

BACKGROUND

1. Field of the Disclosure

The present invention is generally directed to a process for making anodized aluminum articles, and more particularly to an anodizing process for producing articles having a heat stable, colored, hard anodized surface, to a method of making heat stable colored cookware, and to such articles.

2. Description of Related Art

Aluminum metal is readily oxidized. A natural oxidized film occurs on the surfaces of aluminum. The naturally occurring oxide is corrosion resistant, very hard, abrasion resistant, durable, and acts as an insulator to the aluminum. However, the natural occurring form of an oxide film is quite thin. Thus, the natural oxide film can be damaged easily. Pure aluminum naturally produces a highly corrosion resistant aluminum oxide layer, but the layer is very thin. Aluminum alloys naturally produce a slightly thicker aluminum oxide layer, but the layer is less corrosion resistant. Anodizing is a well known process used to enhance the thickness and other characteristics of this oxide film on the surfaces of an aluminum substrate. Aluminum alloys are thus anodized to enhance the corrosion resistance of the oxidation layer, to increase the hardness of the oxidized layer, to allow coloring or dying of the layer, to improve adhesion of the oxidized layer, or the like.

Different anodizing processes are also known. Chromic acid or Type I anodizing processes are old and well known and produce a thin oxide layer on an aluminum substrate that is difficult to dye or color. The process also requires a relatively high-voltage. Sulfuric acid anodizing (Types II and III) is also well known. Sulfuric acid solutions are commonly used for Types II and III anodizing processes, but other solutions are also known and used. Type II anodizing produces a thinner coating on the order of about 1.8 to about 25 µm and is typically conducted in a tank with an electrolytic solution in the range of about 70° F. Type III anodizing produces a thicker coating on the order of about 25 µm and up. Type III anodizing is known as hard anodizing, which is typically conducted in a tank with an electrolytic solution near 32° F. and requires higher voltages than the thinner coatings of a Type II anodizing process. Hard anodizing increases the wear resistance and corrosion resistance of the anodized layer and thus produces a more durable oxidized layer on the aluminum substrate. However, hard anodizing also produces a dark gray colored anodized surface.

Color anodizing is very common in architectural or Type II anodizing processes. Color anodizing is not as common for Type III anodizing or hard anodizing of aluminum. It can be very difficult to color hard anodized aluminum articles because the process produces the very dark gray surface color. The hard anodized surface does not take on color or dye easily.

Manufacturers that have created aluminum cookware know well that, if the anodized layer is colored, the color will fade almost immediately when subjected to relatively high temperatures unless protected in some manner. Thus, anodized aluminum cookware is typically colored by painting the aluminum article after the anodizing process. Painting the cookware requires subsequent manufacturing steps. Some cookware is color anodized, but then an oxygen barrier layer is typically added to the article after the anodizing process to protect the color. This again requires additional manufacturing steps subsequent to anodizing. These paint or barrier layers have been found to wear quickly and/or become easily damaged during normal use.

Many types of cookware have a copper coloring that is highly desirable to consumers. Some cookware of this type is painted after being anodized to add the copper coloring. Some cookware may have an anodized copper coloring or copper surface, which then is protected by a subsequent coating or oxygen barrier layer. The protective layer is applied to the exterior surface of the cookware, after the anodizing process, to reduce or inhibit fading of the copper color during normal use.

As noted above, it is well known to color anodize aluminum of the type II or architectural variety. U.S. Pat. No. 5,587,063 discloses a process for electrolytically coloring anodized aluminum surfaces during an architectural or type II anodizing process. The '063 patent discloses the combination of a copper layer and a tin layer to produce a copper/bronze color. However, a copper/bronze colored aluminum article produced by such a Type II anodizing process would not have a very durable anodized layer. Also, the anodized, colored surface would not be suitable to application of sustained heat over 375° F., as the color would rapidly fade.

SUMMARY

It is believed that no one has commercialized a hard anodized, colored aluminum article, such as cookware, that also must withstand repeated exposure to elevated temperatures greater than 375° F. The present invention is generally directed to a process whereby an aluminum article can be hard anodized and yet achieve a colored surface. The colored anodized surface of the aluminum article produced by the disclosed process is also capable of withstanding repeated exposure to temperatures well above 375° F. Such temperatures are achieved every day by consumers under normal cooking conditions that traditional cookware must be capable of withstanding.

In one example according to the teachings of the present invention, a process of hard anodizing an aluminum article is disclosed to create a heat stable color surface on the article. The process includes the step of anodizing the aluminum article to achieve a hard anodized base layer on a surface of the article. The process also includes the step of depositing a copper layer after the step of anodizing. The process also includes the step of depositing a tin layer after the step of depositing a copper layer.

In one example, the step of depositing a copper layer can include using an electrolytic coloring process.

In one example, the step of depositing a tin layer can include using an electrolytic coloring process.

In one example, both the steps of depositing a tin layer and depositing a copper layer can include using an electrolytic coloring process.

In one example, the step of anodizing the aluminum article can be carried out in a liquid bath at a temperature of between about 46° F. and about 62° F.

In one example, the step of anodizing the aluminum article can be carried out in a liquid bath at a temperature of about 54° F.

In one example, the step of anodizing the aluminum article can be carried out in a liquid bath for a duration of between about 8 minutes and about 30 minutes.

In one example, the step of anodizing the aluminum article can be carried out in a liquid bath for a duration of about 18 minutes.

In one example, the step of anodizing can be carried out in a liquid bath containing sulfuric acid.

In one example, the step of depositing a copper layer can be carried out in a liquid bath at a temperature of between about 64° F. and about 76° F., and more specifically between about 68° F. and 72° F.

In one example, the step of depositing a copper layer can be carried out in a liquid bath at a temperature of about 70° F.

In one example, the step of depositing a copper layer can be carried out in a liquid bath for a duration of between about 1.00 minute and about 5.00 minutes.

In one example, the step of depositing a copper layer can be carried out in a liquid bath for a duration of about 2.75 minutes.

In one example, the liquid bath for the step of depositing a copper layer can be a copper sulfate solution.

In one example, the liquid bath for the step of depositing a copper layer can include sulfuric acid.

In one example, the step of depositing a tin layer can be carried out in a liquid bath at a temperature of between about 64° F. and about 76° F., and more specifically between about 68° F. and about 72° F.

In one example, the step of depositing a tin layer can be carried out in a liquid bath at a temperature of about 70° F.

In one example, the step of depositing a tin layer can be carried out in a liquid bath for a duration of between about 0.25 minutes and about 4.00 minutes.

In one example, the step of depositing a tin layer can be carried out in a liquid bath for a duration of about 1.25 minutes.

In one example, the liquid bath for the step of depositing a tin layer can be a tin sulfate solution.

In one example, the step of anodizing the aluminum article can be carried out in a liquid bath at a temperature of between about 46° F. and about 62° F. and for a duration of between about 8 minutes and about 30 minutes.

In one example, the step of anodizing the aluminum article can include anodizing a cookware product.

In one example according to the teachings of the present invention, a process of hard anodizing an aluminum cookware article is disclosed to create a heat stable color surface on the exterior of the cookware article. The process includes the step of anodizing the aluminum cookware article in a liquid bath at a temperature of between about 46° F. and about 62° F. for between about 8 minutes and about 30 minutes to achieve a hard anodized base layer on the exterior. The process also includes the step of depositing a copper layer, after the step of anodizing, using an electrolytic process in a copper sulfate solution at a temperature of between about 64° F. and about 76° F. for a duration of between about 1.00 minutes and about 5.00 minutes. The process also includes the step of depositing a tin layer using an electrolytic process, after the step of depositing a copper layer, in a tin sulfate solution at a temperature of between about 64° F. and about 76° F. for a duration of between about 0.25 minutes and about 4.00 minutes.

In one example, the step of depositing a copper layer can include providing the copper sulfate solution at about 70° F. and the duration of the step of depositing a copper layer can be about 2.75 minutes.

In one example, the step of depositing a tin layer can include providing the tin sulfate solution at about 70° F. and the duration of the step of depositing a tin layer can be about 1.25 minutes.

In one example according to the teachings of the present invention, a cookware article can be formed according to the processes disclosed and described herein.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

Figure 1:
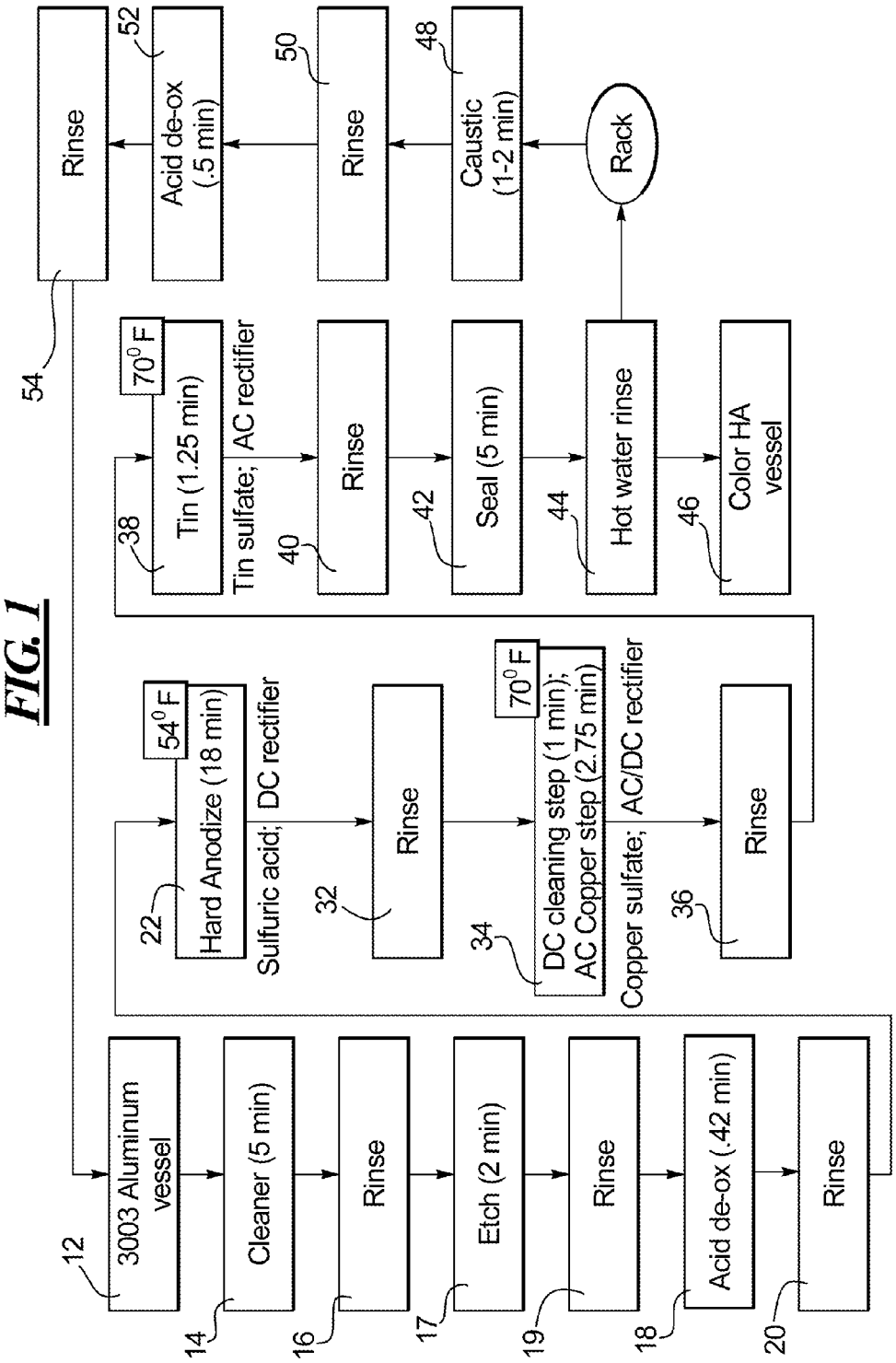
FIG. 1 shows a flow chart of one example of an anodizing process in accordance with the teachings of the present invention.

A process is disclosed herein for fabricating aluminum articles, such as cookware, that have a heat stable copper/bronze color that is formed when the article is anodized. The disclosed process can add color to the metal surface of the aluminum article itself. The color is not a painted layer or a separately applied color layer. The disclosed process does not require the addition of a protective layer or oxygen barrier layer to be applied over the color surface after fabrication of the aluminum article. The disclosed process can produce a colored, hard anodized aluminum article that is wear and corrosion resistant and, thus, highly durable. The color of an article made using the disclosed process may only be damaged or scratched if the hard anodized surface itself is damaged or scratched. However, it can be difficult to damage a hard anodized surface on an aluminum article. The disclosed process can produce an anodized aluminum article with a surface color that is stable through a wide temperature range. The disclosed process can also produce an anodized aluminum article capable of withstanding repeated exposure to high temperatures applied by conventional consumer cooking appliances. The disclosed process can be relatively simple and highly repeatable. These and other objects features and advantages of the present invention will become apparent to those having ordinary skill in the art upon reading this disclosure.

As noted above, the typical aluminum anodizing process of the Type II or architectural variety employs an electrolytic solution maintained at temperatures in the range of about 65° F. to 75° F. The anodized surface produced by such a process can be colored, but the surface is not very durable and not capable of withstanding exposure to high heat. The typical hard anodizing process of the Type III variety employs an electrolytic solution maintained at much lower temperatures, more in the range of about 32° F. to 35° F. A hard anodized aluminum surface is thicker and much more durable. However, the resultant surface is typically a dark gray color as a result of the process. The electrolytic solution in the typical anodizing process often includes sulfuric acid, but can include other acid solutions. A combination of an applied voltage, a duration of the applied voltage and of immersion in the solution, and the cold temperature of the solution, create a very durable oxidized surface layer but also the dark gray color.

The patentee has discovered a suitable modification to the hard anodizing process that still yields a durable, hard anodized surface. The inventive process allows for the surface to be colored to a copper/bronze tone, which is highly desirable to consumers. The patentee has also discovered that the modification to the process also yields a colored anodized surface with comparable Type III or hard anodized characteristics.

The anodized layer can withstand exposure to relatively high temperatures commonly achieved by conventional cooking appliances. The patentee's discovery has been found to substantially reduce fade of the red tones and the copper coloring during exposure to high temperatures in the range of 750 to 800° F. The patentee's discovery has also been found to eliminate fade of the red tones in the copper coloring during exposure to temperatures up to 600° F.

Simply adding copper color to a hard anodized surface may yield a somewhat bronze or copper colored anodized aluminum article, but the darkness of the gray layer typically inhibits or prevents adequate coloring. Without employing the process disclosed and described herein, any such achievable bronze or copper tone begins to fade when the article was subjected to heat above 375° F. The patentee has also determined through testing that, without employing the patentee's novel process, the bronze or copper tone will completely fade away at significantly higher temperatures. For example, cookware often undergoes a non-stick painted baking procedure to add a nonstick coating to the cooking surface. The typical paint baking process subjects the cookware to a temperature of about 800° F. for up to 12 minutes. During testing, the coloring completely faded away when undergoing such a procedure. The patentee has discovered a technique to allow suitable coloring during a hard anodizing process and that results in a color that is heat stable.

Turning now to the drawings, FIG. 1 represents one example of a color anodizing process in accordance with the teachings of the present invention. The disclosed process can produce heat stable copper/bronze colored, hard anodized, aluminum articles. First, an article is fabricated from an aluminum stock material in any suitable manner. In one example, the article can be a cookware vessel 10 (see FIG. 2 for a generic illustration of the article), such as an aluminum pot or pan. The vessel 10 can be fabricated from a pure aluminum material or an aluminum alloy, such as 3003 aluminum, as represented at block 12 in FIG. 1. However, aluminum materials, alloys, or compositions can also be utilized, other than aluminum 3003, to fabricate the vessel 10. The invention is not necessarily intended to be limited to a particular type of aluminum stock, quality, grade, alloy, or the like. Use of the terms aluminum article or aluminum vessel herein are intended to embody any such aluminum material or allow. The process of the invention can also be used to manufacture aluminum articles, other than cookware vessels. However, the disclosed process is particularly well suited for cookware articles because of the hard anodized surface and the stability of the color when subjected to high temperatures.

The aluminum vessel 10 can be prepared for the anodizing process by first undergoing a number of preliminary, common preparation procedures. These preliminary steps are optional, can be performed in different orders or sequences, and can be employed as needed or desired for a given application or end article. Also, any one or more of these preliminary preparation steps can be performed as a part of the anodizing process line or as separate steps prior to the vessel being delivered to the anodizing process line.

For example, the vessel 10 can be cleaned as indicated by block 14 as an initial step of the anodizing line. In one example, the cleaning step can be conducted by immersing the vessel 10 in a tank containing a detergent and water solution. The cleaning solution can be maintained at an elevated temperature, such as about 120° F. to about 140° F. Air bubbles, or another suitable agitation source, may be dispersed in the solution. In one example, the cleaning step of block 14 can result in the vessel being immersed for about 5 minutes in the cleaning solution. The cleaning step can be conducted to remove oils and other residue and/or contaminants left on the surfaces of the aluminum vessel 10 during the initial metal fabrication and forming procedures.

The vessel 10 can then be rinsed as indicated by block 16 to remove any detergent solution from the surfaces of the vessel. The aluminum vessel 10 can then undergo an etching step as indicated at block 17. In one example, the etching step can be performed by immersing the vessel 10 in a tank of caustic soda, such as sodium hydroxide, to caustically etch the exterior surfaces of the vessel. The vessel can be immersed in the etching solution for about 2 minutes in one example, to further prepare the vessel surfaces for the coloring processes described below.

The vessel 10 can then again be rinsed in a second rinsing step as indicated by block 19. This second rinse can be performed to remove the caustic etching solution from the surfaces of the vessel. The vessel 10 can then undergo an acid deoxidizing or de-smut process. For example, the vessel 10 can be immersed in a tank holding an acid solution as indicated by block 18 in FIG. 1. During this step, much if not all of the natural oxidation on the surface of the vessel 10 can be removed, if desired. The de-smut step at block 18 can be performed for a very short time, such as for about 10 seconds to about 45 seconds. In one example, the deoxidizing or de-smut step can be about 25 seconds.

The vessel 10 can then be rinsed again as indicated by block 20. This third rinsing step can be conducted to remove any of the acid solution from the de-smut or deoxidizing step at block 18. The rinsing steps of blocks 16, 19, and 20 can be conducted utilizing water, or water-based cleaning solutions compatible with anodizing processes, as is known in the art. Also, each of these preliminary preparation steps can vary from the example shown and described here in. Additional steps may be included, if desired. Also, different solutions can be utilized at any one of the preparation steps. The time necessary to complete each of the steps to prepare the vessel 10 can also vary.

The vessel 10 is now ready for the initial hard anodizing step as represented by block 22. The step at block 22 in this example is modified from a conventional hard anodizing process. In this example, the temperature of the electrolyte solution and the time that the vessel 10 is anodized in the solution are different from a conventional hard anodizing process. In this step, the vessel 10 is placed in a tank 24 (see FIG. 2) that holds a sulfuric acid electrolytic solution 26 as is known in the art. Cathodes 28 are provided in contact with the solution 26 and the vessel 10 is submerged in the solution as well. The vessel 10 is coupled to a DC rectifier and acts as the anode for this process. A DC electric current is then applied between the aluminum vessel 10, which is the positive terminal or anode, the electrolyte solution 26, and the cathodes 28. The cathodes 28 can be lead, graphite, aluminum, stainless steel, or other suitable elements. In one example, the cathodes can be aluminum elements for the hard anodizing step of block 22.

The sulfuric acid or electrolytic solution 26 can be maintained at a temperature between about 46° F. and about 62° F. In one specific example, the process disclosed and described herein is particularly effective with the hard anodizing solution at about 54° F. Although a sulfuric acid solution is disclosed herein for the electrolyte solution 26, other water and acid solutions can be utilized, if desired, and may be suitable for a particular application. The temperature of the solution is well above the typical, near freezing, temperature utilized for a conventional hard anodizing or Type III process. An electrolyte solution of a typical hard anodizing process is maintained at about or just above the freezing temperature of water or just above 32° F. The vessel 10 can be maintained in the electrolyte solution in this example with the DC current applied for about 8 minutes to about 30 minutes. The current density can be from about 25 amps per square foot (A/sq. ft.) to about 50 A/sq. ft. In one example, the vessel 10 can be immersed or submerged in the electrolyte solution 26 with the DC current applied at a current density of about 25 A/sq. ft. for about 18 minutes. In another example, the vessel 10 can be immersed with the DC applied current at a current density of about 50 A/sq. ft. for about 10 minutes.

The various parameters in the hard anodizing step of block 22 can be varied from the examples disclosed above, depending on the desired hard anodized surface characteristics. However, below about 45° F., the surface of the vessel 10, if subjected to the DC current for a duration sufficient to produce hard anodized surface characteristics, can become too thick and too dark gray in color to then be subsequently changed to a copper/bronze tone as described herein. Above about 63° F. the surface of the vessel 10 does not achieve hardness or scratch resistance characteristics sufficient to be considered a hard anodized surface, regardless of the applied voltage, current density, or time of exposure to the solution. Within the temperature range of between about 46° F. and about 62° F., the vessel 10 can be anodized with a current density of above about 20 A/sq. ft. to produce a surface with sufficient hardness, durability, and scratch resistance to be considered hard anodized.

The current density can also be varied from about 25 to about 50 A/sq. ft. A higher current density permits the vessel 10 to be exposed to the electrolytic solution 26 for less time while still producing a hard anodized layer of a desired thickness. A lower current density will require the vessel to be exposed to the solution for a longer period of time to produce the same hard anodized surface characteristics. Current densities of below about 20 A/sq. ft. typically do not produce a suitable hard anodized surface. Current densities well above 50 A/sq. ft. may cause burns on the vessel surface at point of contact to the rack.

It may be highly desirable in many applications to mass produce articles or vessels. For example, a large number of vessels 10 (on the order of 30 or 40 per batch) may be anodized at the same time in the same liquid bath. Uniformity or consistency in the color and thickness of the hard anodized surface of the vessel 10 would be highly desirable. Testing has shown that the properties and characteristics, such as the thickness, of the hard anodized layer from vessel to vessel, both within each batch and from batch to batch, can be achieved using a lower current density, such as about 25 A/sq. ft., with longer exposure times, such as for about 18 minutes. However, there may be applications where time or process speed is more important than uniformity in the product characteristics.

The properties of the anodized layer 30 (see FIG. 3) after undergoing the above-described hard anodizing process are suitable be considered a hard anodized surface. The hard anodized layer 30 may not be quite as thick, hard, or scratch resistant as a layer produced by a conventional Type III process, but testing has found the vessel layer 30 to be suitably hard and durable. Also, thinner hard anodized layer 30 is significantly less dark, less dull, and less gray than that produced by a conventional hard anodizing process at much colder temperatures. Thus, the layer 30 is much more suitable to take on color as described below. As noted earlier, architectural or Type II anodizing is conducted at temperatures considerably higher than 54° F., such as on the order of 70° F. and above. The Type II anodized surface layer is not very durable or wear resistant and is not suitable where a hard anodized surface would be required.

Once the hard anodizing step at block 22 is complete, the vessel 10 is then rinsed again to remove the sulfuric acid or other electrolyte solution from the surfaces of the vessel. This rinsing step, as indicated at block 32 in FIG. 1, can also be similar or identical to the earlier described rinsing steps at blocks 16, 19, and 20.

Figure 2:
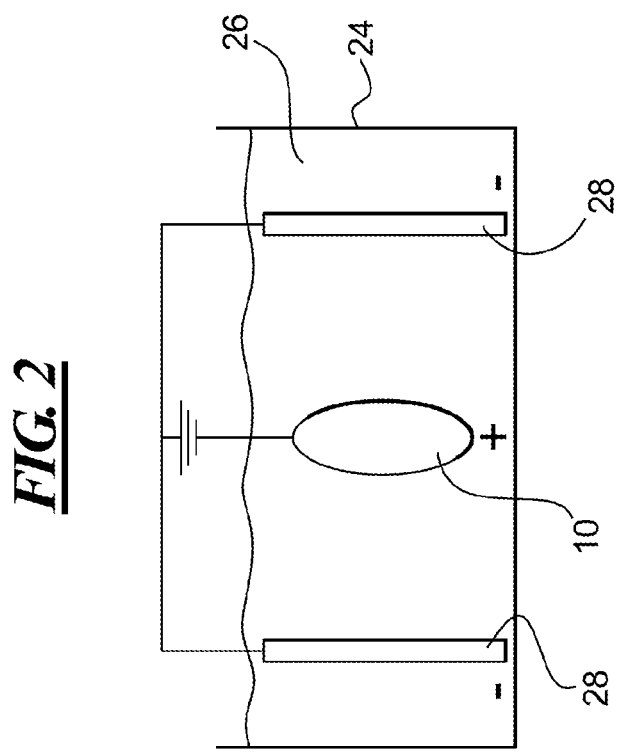
FIG. 2 shows a simplified schematic view of an electrolytic tank used during the process of FIG. 1 and shows an aluminum article therein.

The vessel 10 is then ready to undergo a first coloring step represented by block 34 in FIG. 1. In this step, the vessel 10 is immersed in a copper sulfate electrolyte solution held in a tank. The copper sulfate solution should also contain sulfuric acid or other suitable acid. The acid renders the liquid bath or solution 26 much more conductive, which helps deposit copper in the hard anodized layer 30. The vessel 10 is connected to an AC/DC rectifier and to one or more counter-electrodes, similar to the arrangement shown in FIG. 2 and described earlier with reference to the hard anodizing step at block 22. However, in this step, a different power source can be used so as to provide the DC current and the AC current, when needed. Also, vessel 10 can be termed an electrode and not an anode and the cathodes 28 in FIG. 2 are termed counter-electrodes in this step. The counter-electrodes in one example are stainless steel to accommodate the AC current during the step of depositing copper. The counter-electrodes 28 in this step can also be tin, graphite, or other suitable material.

The copper sulfate solution in this step is maintained at a temperature between about 64° F. and about 76° F., and in one specific example is maintained at about 70° F. During this step, the pores of the hard anodized layer 30 of the vessel 10 are first cleaned by passing a DC current between the vessel 10, i.e., the anode, the copper sulfate solution, and the cathodes for about 1 minute. A first coloring step is then conducted by passing an alternating current or AC current between the vessel 10 or electrode, the copper sulfate solution, and the counter-electrodes for between about 1.0 minutes to about 5.0 minutes. In one example, a desired copper/bronze tone is achieved via an AC current duration of about 2.75 minutes. The coloring step of block 34 deposits a copper layer or copper into the pores of the hard anodized layer 30 produced at block 22. As is known in the art, the hard anodized layer is a microporous surface with a microscopic honeycomb structure. The copper material is deposited or driven into the pores of the hard anodized layer and gives the hard anodized layer a copper/bronze coloring. The hard anodized surface structure is thus still exposed as the outermost surface, maintaining its durability.

With a thinner hard anodized layer, more copper can be deposited and visible in the layer. Exposure of the vessel 10 to the electrolytic solution 26 and AC voltage for less than about 1.0 minute will not deposit sufficient copper to affect the color of the anodized layer 30. Exposure of the vessel 10 to the electrolytic solution 26 and the AC voltage for more than about 5 minutes achieves diminishing returns relative to the copper/bronze color. Within the range of about 1.0 to about 5.0 minutes, the color of the layer 30 can be varied, depending on the exposure time.

The particular temperature of the copper sulfate solution, the duration of the current being passed between the elements of the tank, and the specific composition of the solution can be varied as needed for a particular application. For example, the duration for the cleaning step can be varied to be more or less than the 1 minute duration for passing the DC current between the elements. In addition, the duration for the coloring step can be varied to be more or less than the 2.75 minute duration disclosed herein, such as for example, between about 1.0 minute and about 5.0 minutes.

At the completion of the cleaning and copper coloring steps represented by block 34, the vessel 10 is then rinsed as represented by block 36. This rinsing step is performed to remove remnants of the copper sulfate solution from the coloring step of block 34. Again, this rinsing step can be similar or identical to the prior rinsing steps of block 16, 19, 20, and 32.

As shown in FIG. 1, the vessel 10 then undergoes an additional deposition and coloring step has represented by block 38. The vessel 10 is immersed in a tank containing a tin sulfate solution, again maintained at a temperature of about 70° F. An alternating or AC current is passed between the vessel 10, i.e., the electrode, the tin sulfate solution, and the counter-electrodes of the tank by the AC rectifier during this step. The counter-electrodes 28 during this step can also be stainless steel, tin, graphite, or other material suitably compatible with the solution and the AC applied voltage. In one example, the current can be passed between the elements during this deposition step for about 1.25 minutes. Similar to the copper coloring step at block 34, the temperature of the tin sulfate solution in this coloring step can be varied from the 70° F. temperature, such as between about 64° F. and 76° F. The duration of the current being applied can also vary from the disclosed 1.25 minutes, such as for example, between about 0.25 minutes to about 4.0 minutes.

During the deposition and coloring step represented by block 38, a tin layer is deposited in the pores of the hard anodized layer 30 and the deposited copper layer, subsequent to the copper layer being deposited. The tin layer material is also deposited or driven into the honeycomb-shaped pores of the microporous hard anodized surface.

Again, the vessel can be exposed to the tin sulfate solution and the AC voltage for a duration within the range of about 0.25 minutes to about 4.0 minutes. An insufficient amount of tin may be deposited for shorter time durations and diminishing returns may be achieved for longer durations. In one example, a desired copper/bronze tone is achieved by the disclosed 1.25 minute exposure time. The characteristics of the AC voltage applied during both the copper and tin deposition steps has very little affect on the amount of copper or tin deposited.

After completion of the tin deposition step of block 38, the vessel 10 is then rinsed again as represented by block 40. The vessel is rinsed to remove remnants of the tin sulfate solution from the prior step at block 38. The rinsing step at block 40 can again be similar or identical to the prior rinsing steps represented by block 16, 19, 20, 32, and 36.

Upon completion of these anodizing process steps, the exterior surface of the vessel 10 is then sealed to close the pores of the microporous anodized surface. As represented by block 42, the vessel 10 can be immersed in a sealing solution, such as nickel acetate, lithium acetate, or other suitable solution, and maintained in the solution for about 5 minutes to about 10 minutes, as is known in the art. The porous surface of the anodized aluminum vessel 10 is hydrolyzed as a result. During this process, the oxide swells and closes the pores of the anodized surface. The sealing step represented by block 42 can be conducted at room temperature using a chemically enriched water solution such as the above-noted nickel acetate or lithium acetate. Alternatively, the sealing step may be performed in hot water. In one example, hot water maintained at about 180° F. can be used to seal the exterior surfaces of the vessel 10.

As represented at block 44, the vessel 10 can then be rinsed, such as by using hot water at about 120° F. to about 140° F., to remove remnants of the sealing solution and other process contaminants. After this rinsing step, fabrication of the vessel 10 is essentially completed as represented by block 46. The completed vessel 10 is a color hard anodized aluminum vessel that is suitable for repeated high temperature exposure and yet still capable of retaining its copper/bronze coloring. Further, the coloring is applied as a part of the metal anodized surface, which is a hard durable surface, instead of as a subsequently applied, painted surface of the prior art. The disclosed process does not require that the vessel be subsequently painted or sealed with a separate material layer to protect the color after completion of the anodizing steps, also required of color anodized prior art articles.

As shown in FIG. 1, the supporting rack and equipment used to carry the vessel 10 through the anodizing process will require cleaning for further and subsequent use. The rack can be cleaned in a caustic solution as represented by block 48, rinsed as represented by block 50, de-smutted or deoxidized as represented by block 52, and then rinsed again as represented by block 54. The rack is then ready for use again. The rack can also be cleaned or stripped of any copper and tin material that was deposited on its surfaces in a previous process run during the etching step at block 17. The etching step can reduce the required tank time during the copper deposition step, at the same time that the rack is stripped.

Figure 3:
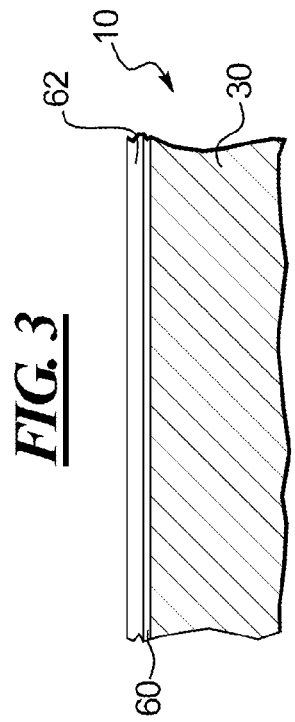
FIG. 3 shows a simplified cross-section of an aluminum article formed by the process of FIG. 1.

FIG. 3 shows a simplified cross-section of the vessel 10 after undergoing the hard anodizing, coloring process disclosed herein. The vessel 10 has the above-noted underlying aluminum substrate layer 30 and a thin, natural oxidized layer 60 over the exterior surfaces of the aluminum substrate 30. The hard anodized layer 62 is formed over the natural oxidation layer 60 according to block 22 in FIG. 1. The separately deposited copper and tin layers are not depicted in this figure because these layers are essentially deposited in the pores of the microporous hard anodized layer 64. However, these layers are visible on the exterior of the vessel 10 as the copper/bronze coloring of the hard anodized surface.

The combination of the tin layer, the copper layer, and the hard anodized surface or layer formed according to the parameters discussed above with respect to blocks 22, 34, and 38 results in a hard anodized aluminum vessel 10 having a copper/bronze color. The combination of the tin deposited over copper, as disclosed herein, changes the copper coloring to a copper/bronze coloring over the exterior of the vessel. The tin also helps to reduce or eliminate fading of the color during use. The coloring is maintained and does not fade at all upon repeated exposure to temperatures of up to 600° F. The coloring also only minimally fades upon repeated exposure of such a vessel to temperatures of between 750° F. and 800° F. Cookware is not normally exposed to temperatures above about 550° F., particularly for normal consumer use. Otherwise, non-stick coatings on conventional cookware could be damaged. The combination of the disclosed coloring steps with the disclosed, modified hard anodizing steps yields a hard anodized, colored surface that is also highly wear resistant, chip resistant, and durable as well as being heat-stable.

During manufacture of cookware as disclosed herein when applying a non-stick coating, the cookware is subjected to heat on the order of about 800° F. The red tones of the disclosed copper/bronze coloring have been shown during testing to diminish slightly when exposed to such a high temperature. The color then stabilizes and does not fade, particularly at lower temperatures. If the disclosed process were utilized to fabricate cookware without any non-stick coating, the cookware could be preheated to 800° F. insure that the color is fully stabilized prior to retail sale. Alternatively, the cookware could be sold without any high temperature preheat cycle because the disclosed process has been shown to produce a color that does not fade at temperatures below about 600° F., which is the practical upper limit for consumer use.

The elevated temperature (compared to conventional hard anodizing) of the hard anodizing step at block 22 and the relatively shorter duration of exposure to the DC current (compared to conventional hard anodizing) produces a hard anodized surface on the aluminum substrate. However, the hard anodized surface is relatively thin, and in one example is about 0.7 mil to about 0.8 mil (about 0.0007 to about 0.0008 inches thick). The thinner hard anodized layer results in the layer being less dull, less dark, and less gray than a conventional hard anodized layer produced at near-freezing electrolyte solution temperatures. During testing, the hard anodized surface produced as disclosed herein has proved to be thick enough, sufficiently resistant to scratching, significantly high heat durable, and light enough in color so as to be suitable for further coloring steps.

Architectural or Type II anodizing is typically colored by utilizing dyes and not by depositing metal. These dyes and the type II anodized surface characteristics are not high heat durable. Such dyes are also not particularly suitable for coloring hard anodized surfaces because of the dark gray and dull nature of a hard anodized layer. Thus, copper metal and tin metal are used during the coloring steps of the anodizing process disclosed herein. If one were to stop at the copper coloring step represented by block 34, the color of the hard anodized vessel 10 would be bright copper, like a shiny penny. However, the bright copper color would fade rapidly during use because copper easily oxidizes, and particularly at high temperatures. Copper oxide would rapidly form on the surface, quickly fading the copper color. A protective oxide layer or oxygen barrier over the top of just a copper colored layer has not been found to be successful in withstanding exposure to high temperatures. Applying or depositing tin after the copper color is deposited darkens the copper colored to something similar to an old penny or resembling a slightly oxidized copper/bronze coloring. However, this combination has been found to be highly heat-stable up to near 800° F., even after repeated exposure. The color remains stable from fabrication through repeated, normal use.

Although the equipment utilized to perform the disclosed hard anodizing coloring process disclosed herein can vary, one example is provided. An AC Universal Coloring power supply was used for both the copper coloring step and tin deposition step described herein. The AC input was 460 V, single phase, at 60 Hz. The AC output was 0-30 V and 0-1000 A. The pretreat output for the copper step was 0-27 V and 0-900 A. The copper color output was 0 to ±13.5 V and 0 to ±450 A. These ratings were calculated using a 30 V RMS, 1000 A RMS, AC equivalent rating of the unit.

Below, some representative test results are provided based on testing conducted to determine the solution for the problems of unacceptable color and significant color fade upon heat exposure. The tin coloring step enhanced the vessel color and essentially solved the fade problem. Much additional testing was also conducted, though the results are not presented herein.

Sample Test Results
Load #1—skillet vessel; aluminum alloy; smooth finish
a. Cleaner soak 5 minutes
b. no etch
c. 10 second deox
d. Anodizing tank—temperature 54° F.; 10 minute cycle at 50 A/sq ft
e. 3 minute ramp; 60 sec DC; 95 sec Copper AC
f. Unsealed
g. Result: Good copper color
h. Heat test—small furnace at 595° F.; color begins fade after 20 minutes
i. Heat test—raised temp to 650° F.; color faded significantly Load #2—Same as Load #1 vessel
a. Cleaner soak 5 minutes
b. no etch
c. 10 second deox
d. Anodizing tank—temperature 54° F.; 10 minute cycle at 50 A/sq ft
e. 3 minute ramp; 60 sec DC; 95 sec Copper AC
f. 15 sec Tin AC after Copper
g. Unsealed
h. Result: very nice "oil rubbed bronze" color
i. Heat Test—small furnace; color stable at 530° F.

Load #3—Same as Load #1 vessel
a. Cleaner soak 5 minutes
b. no etch
c. 10 second deox
d. Anodizing tank—temperature 54° F.; 10 minute cycle at 50 A/sq f
e. 3 minute ramp; 60 sec DC; 95 sec Copper AC
f. 15 sec Tin AC
g. 5 min seal (Enviroseal 2500 at 180° F.)
h. Result: Good bronze color
i. Heat Test—small furnace; color stable at 530° F.; no fade Load #4—skillet vessel; aluminum alloy; brushed finish
a. Cleaner soak 5 minutes
b. no etch
c. 10 second deox
d. Anodizing tank—temperature 54 F; 10 minute cycle at 50 A/sq ft
e. 3 minute ramp; 60 sec DC; 95 sec Copper AC
f. 20 sec Tin AC
g. 5 min seal (Enviroseal 2500 at 180° F.
h. Result: Good bronze color
i. Heat test in small furnace at 802° F.; 15 minutes; no fade
j. Heat test in big oven (more air) at 750° F.; 20 minutes; no fade Although certain anodizing processes and anodized articles have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A process of hard anodizing an aluminum cookware article to create a heat stable color surface on the exterior of the cookware article, the process comprising the steps of:
anodizing the aluminum cookware article in a liquid bath at a temperature of about 54° F. for between about 8 minutes and about 30 minutes to achieve a hard anodized base layer on the exterior;
depositing a copper layer after the step of anodizing using an electrolytic process in a copper sulfate solution; and
depositing a tin layer using an electrolytic process, after the step of depositing a copper layer, in a tin sulfate solution.

2. A process according to claim 1, wherein the step of depositing a copper layer includes providing the copper sulfate solution at about 70° F. and wherein the duration of the step of depositing a copper layer is about 2.75 minutes.

3. A process according to claim 1, wherein the step of depositing a tin layer includes providing the tin sulfate solution at about 70° F. and wherein the duration of the step of depositing a tin layer is about 1.25 minutes.

4. A process according to claim 1, wherein the step of depositing a copper layer is conducted with the copper sulfate solution at a temperature of between about 64° F. and about 76° F. for a duration of between about 1.00 minutes and about 5.00 minutes.

5. A process according to claim 1, wherein the step of depositing a tin layer is conducted with the tin sulfate solution at a temperature of between about 64° F. and about 76° F. for a duration of between about 0.25 minutes and about 4.00 minutes.

6. A process according to claim 1, wherein the step of anodizing the aluminum cookware article is carried out for a duration of about 18 minutes.

7. A process according to claim 1, wherein the step of depositing a copper layer is carried out at a temperature of between about 68° F. and about 72° F.

8. A process according to claim 1, wherein the step of depositing a tin layer is carried out at a temperature of between about 68° F. and about 72° F.

* * * * *